March 3, 1936. F. M. ANTHONY Re. 19,875

SPARK PLUG

Original Filed Nov. 28, 1931

INVENTOR.
Felix M. Anthony
BY Joseph B. Gardner
ATTORNEY

Reissued Mar. 3, 1936

Re. 19,875

UNITED STATES PATENT OFFICE 19,875

SPARK PLUG

Felix M. Anthony, Piedmont, Calif., assignor of one-fourth to Kenneth C. Gillis and one-fourth to Darrell B. Edwards, both of Oakland, Calif.

Original No. 1,989,671, dated February 5, 1935, Serial No. 577,763, November 28, 1931. Application for reissue July 29, 1935, Serial No. 33,742

10 Claims. (Cl. 123—169)

This invention relates to improvements in spark plugs and more particularly to the ground terminals of spark plugs for internal combustion engines.

The principal object of the invention is to arrange and design the ground terminal to compensate for its expansion and contraction to maintain an accurate "spark gap" between the electrode terminals at all engine temperatures.

Other objects and advantages appear as the description progresses.

Broadly stated, the invention consists of arranging the ground terminal to form a reverse curve. The two branches of the curve expand and contract in opposite directions; thus each compensates for the movements of the other, maintaining the end of the terminal in a fixed position with respect to the positive electrode of the spark plug.

In this specification and the accompanying drawing the invention is disclosed in its preferred form. It is to be understood, however, that it is not limited to this form because it may be embodied in other forms within the purview of the claims following the description.

Figure 1:
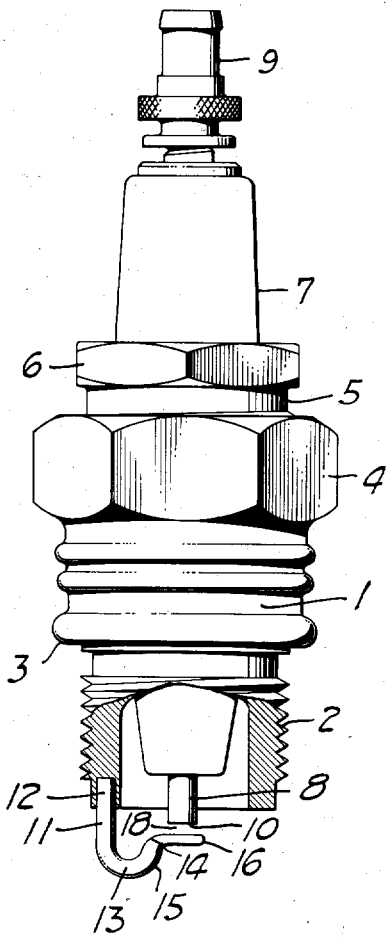
Figure 1 is a side elevation of a spark plug having electrode terminals constructed in accordance with this invention.
Figure 2:
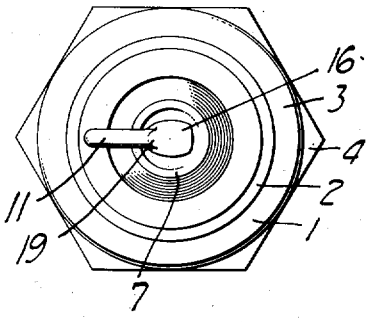
Figure 2 is an end view of the same from below.

In detail the construction illustrated in the drawing comprises the outer shell 1 having the threaded neck 2 for engaging the cylinder head of the motor, not shown. The shoulder 3 provides for compressing the usual gasket against the cylinder head when the shell is screwed into place by means of the hexagonal portion 4.

The center bore of the top portion of the shell is internally threaded to receive the bushing 5, having the hexagonal head 6.

The dielectric core 7 is usually formed of porcelain, compressed mica, or other refractory insulating material. This core extends through the shell 1 and is held in fixed position by screwing down the bushing 5 which forces the core against a suitable shoulder provided within the shell 1.

The center electrode 8 extends entirely through the core and is threaded at its upper end to engage the conventional terminal coupling 9. The lower end of the electrode projects through the core 7 and terminates in the flat end 10 beyond the edge of the shell.

The structure thus far described is the construction of the conventional spark plug, the mechanical characteristics of which will vary with the type of motor in which it is used. It will be obvious to those skilled in the art that the present invention may be applied with suitable modifications to any of the existing types of spark plugs.

The superiority of spark plugs in which the spark gap is located coincidentally with the axis of the spark plug has been long recognized by the art. However, it has been found to be impractical to use this type of spark plug due to variations in the length of the spark gap under varying temperatures. In prior constructions having this type of spark gap, the ground terminal is fixed in the outer shell and invariably has a single bend to bring the end if the terminal into proximity with the center electrode. As the spark plug becomes heated, the bent portion of the ground terminal tends to partially straighten out, thus greatly increasing the length of the spark gap. This prevents a sufficient volume of current bridging the gap to form the hot spark necessary in modern internal combustion motors.

It is the purpose of the present invention to render practical the use of spark plugs having a spark gap located coincidental with the axis thereof. This is accomplished by designing the ground terminal to maintain an accurate spark gap at all temperatures of engine operation.

The ground terminal 11, provided by this invention, is fixed at 12 to the edge of the shell 1 and is bent at 13 toward the center electrode forming a semicircular arc. The terminal is bent in the opposite direction at 14 to form an arc joining the arc 13 at 15 to form a reverse curve. The arc 14 has a shorter radius than the arc 13, the ratio of the two radii in the spark plug here shown being substantially two to one.

The end portion 16 of the terminal extends tangentially from the arc 14 and lies in juxtaposition with the end of the center electrode leaving the "spark gap" 18 of the usual clearance. The terminal end 16 is preferably partially flattened to form a plane parallel with the flat end 10 of the electrode to increase the sparking area. It is desirable that the flattening 16 should be so performed to leave the fillet 19 to reinforce the arc 14.

Figure 3:
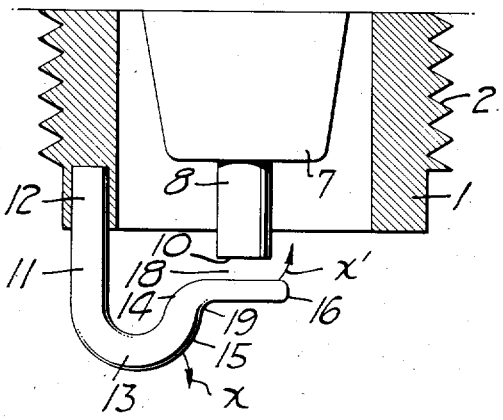
Figure 3 is an enlarged vertical section of the lower portion of the spark plug diagrammatically showing the directions of the movements of the curved portions of the ground terminal during expansion.

The lower portion of the bent terminal should be located below the terminal end 16 to drain away any accumulations of oil from the spark gap. As the engine becomes heated, the arc 13 in the ground terminal expands and begins to straighten out in the direction of the arrow $x$ (see Fig. 3). However, the arc 14 expands and straightens out in the opposite direction as indicated by the arrow $x'$ and compensates for the expansion of the arc 13, thus maintaining the terminal end 16 in fixed position with respect to the end of the center electrode.

To secure perfect compensating expansion action of the ground terminal it is important that the approximate proportions of the branches of the reverse curve be maintained in manufacture. The longer radius and length of the arc 13 is determined by several factors in the operation of the spark plug.

It is to be noted that the temperature of the ground terminal varies throughout its length. The heat of the portion forming the arc 13 is largely conducted away through the adjacent shell 1 into the larger relatively cool body of the cylinder head. The arc 14 being adjacent the intense heat of the spark reaches a greatly higher temperature than the arc 13. This requires the arc 13 to be of larger radius and length to increase the distance of its expansion to compensate for the greater angular expansion of the more heated arc 14.

The partial flattening of the terminal end 16 also reduces the thickness of the terminal 11 at the arc 14. As this flattening of the cross section of the arc further increases its angular expansion, it provides further necessity for the larger size of the arc 13.

I claim:

1. A spark plug having a shell, an insulated electrode in said shell, and a ground terminal having one end fixed in said shell and its free end in juxtaposition to said electrode to form a spark gap of predetermined width the ground terminal being bent into a reverse curve with unequal radii, the greater radius being adjacent said shell, the cross section of said terminal being flattened transversely to the plane of the radius of the curve adjacent said electrode, all combined and arranged to maintain substantially the predetermined width of said spark gap under working temperature variations.

2. A spark plug having a shell, an insulated electrode in said shell, a ground terminal bent in a reverse curve and having its free end portion in juxtaposition with said electrode to form a spark gap of predetermined width, the radius of the curve adjacent the shell being greater than the radius adjacent the electrode, said curves being proportioned one to the other to maintain said spark gap the same relative width under various working temperature variations.

3. A spark plug having a shell, an insulated electrode in said shell, a ground terminal bent in a reverse curve and having one end fixed in said shell and its free end arranged in a plane substantially parallel with the plane of the end of said electrode to form a spark gap of predetermined width, the radius of the curve adjacent the shell being greater than the radius adjacent the electrode, said curves being proportioned one to the other to maintain said spark gap the same relative width under various working temperature variations.

4. A spark plug including a shell, a pair of electrodes one of which is separately affixed to said shell, said electrodes having opposed spark gap terminal areas and when heated having linear expansions tending to increase the spacing between said areas, and one of said electrodes being curved to provide when heated a net angular displacement of said gap terminal area on the electrode in a direction reducing the space between said areas.

5. A spark plug including a shell, a pair of electrodes one of which is separately affixed to said shell, said electrodes having opposed spark terminal areas, one of said electrodes having the point of support and the said terminal area thereof at spaced longitudinal positions relative to the longitudinal axis of the plug whereby the electrode when heated will have a linear expansion causing the longitudinal displacement of the terminal area thereon, said last named electrode being curved and serving when heated to angularly displace said last named terminal area longitudinally in a direction opposite to the aforesaid displacement caused by the linear expansion of the electrode.

6. A spark plug including a shell, a pair of electrodes one of which is separately affixed to said shell, said electrodes having opposed spark gap terminal areas, one of said electrodes having reversely related curves of such curvature and spacing from the gap terminal area thereon as to provide when heated a net displacement of said last named area in a direction opposite to the displacement thereof caused by the linear expansion of the electrode.

7. A spark plug including a shell, a pair of electrodes having opposed spark gap terminal areas, one of said electrodes being generally longitudinally arranged, the other of said electrodes being attached to said shell and having reversely related curves defining a pair of longitudinally extending leg portions of unequal lengths, said curves being of such curvature and spacing from the gap area of said last named electrode as to provide when heated a net displacement of said last named area in a direction opposite to the net longitudinal displacement thereof caused by the linear expansion of said leg portions.

8. A spark plug comprising, a longitudinally extending electrode having a spark gap terminal area at an end thereof, a second electrode supported at a point transversely spaced from said first electrode and having a gap area spaced longitudinally from said first gap area to define therewith a spark gap substantially coincident with the longitudinal axis of said first electrode, said second electrode being formed with reversely related curves intermediate a point of support and gap area thereof, the curve nearest said point of support extending further longitudinally than the curve adjacent said gap area.

9. A spark plug having a shell, an insulated electrode extending longitudinally through said shell and having an end longitudinally spaced from said shell, a second electrode fixed to said shell and having its free end longitudinally spaced from said first electrode end to define a spark gap coincident with the longitudinal axis of said first electrode, said second electrode having curved portions providing when heated and by the flexing of said portions for a net longitudinal displacement of the free end of the electrode opposite to the longitudinal displacement caused by the linear expansion of the longitudinal component of the length of said electrode between the point of support thereof and said free end.

10. A spark plug including a shell, a pair of electrodes one of which is separately affixed to said shell, said electrodes having opposed spark gap terminal areas, one of said electrodes being curved and proportioned relative to said other electrode that on heating of the electrodes the summation of the linear and angular expansions of the various parts of the electrodes affecting the displacement of said areas relative to each other will be substantially balanced.

FELIX M. ANTHONY.